United States Patent [19]

Fukushima

[11] Patent Number: 4,932,286
[45] Date of Patent: Jun. 12, 1990

[54] FLYWHEEL ASSEMBLY
[75] Inventor: Hirotaka Fukushima, Osaka, Japan
[73] Assignee: Kabushiki Kaisha Daikin Seisakusho, Osaka, Japan
[21] Appl. No.: 334,276
[22] PCT Filed: Mar. 28, 1988
[86] PCT No.: PCT/JP88/00310
 § 371 Date: Dec. 2, 1988
 § 102(e) Date: Dec. 2, 1988
[87] PCT Pub. No.: WO88/08093
 PCT Pub. Date: Oct. 20, 1988
[30] Foreign Application Priority Data
 Apr. 15, 1987 [JP] Japan .................. 62-92490
[51] Int. Cl.⁵ ............................................ F16F 15/10
[52] U.S. Cl. ................................ 74/574; 74/572; 464/68; 132/106.2
[58] Field of Search ............... 74/574, 572; 464/89, 464/68 X, 63, 64, 65; 192/106.2 X, 70.18, 106.1, 110 B

[56] References Cited
U.S. PATENT DOCUMENTS 4,723,463  2/1988  Reik et al. ................ 74/574
4,724,719  2/1988  Werner et al. ............ 74/574
4,727,970  3/1988  Reik et al. ................ 74/574 X
4,767,380  8/1988  Chasseguet et al. ....... 464/68
4,782,933 11/1988  Jäckel et al. ............. 192/106.1 X
4,790,419 12/1988  Loizeau .................. 192/70.18

FOREIGN PATENT DOCUMENTS 2609132   7/1988  France ................. 192/70.18
61-23543  2/1986  Japan .
61-223348 10/1986  Japan .
1233968   6/1971  United Kingdom ...... 192/70.18

Primary Examiner—Vinh T. Luong
Attorney, Agent, or Firm—Armstrong, Nikaido, Marmelstein, Kubovcik & Murray

[57] ABSTRACT

This invention relates to a flywheel assembly including a flywheel divided into first and second flywheels (20 & 23). An intermediate friction force generation mechanism (42) generating a weak friction force in a small torsion angle range and a medium friction in an intermediate torsion angle range is provided and further a maximum friction force generation mechanism (54) generating a maximum friction force in a large torsion angle range is provided, in between the both flywheels (20 & 23). A large torsion torque exceeding a working torsion angle of the intermediate friction force generation mechanism (42) can be buffered by a large friction force generated by a slip action of the maximum friction force generation mechanism (54).

7 Claims, 2 Drawing Sheets

FLYWHEEL ASSEMBLY

INDUSTRIAL USEFUL FIELD

This invention relates to a flywheel assembly having divided flywheels.

BACKGROUND ART

In a flywheel assembly having divided type flywheels; a play 12, a torsion spring 13 and a friction member 14 are disposed in series between a first flywheel 10 and a second flywheel 11, and a friction member 15 generating a hysteresis torque TH is connected in parallel, as illustrated in FIG. 7.

In such structure, as illustrated in FIG. 8, the friction member 14 begins to slip at a torque TL when the torsion spring 13 actuates in a torsion angle range beyond a clearance $\epsilon$ settled by the play 12 to further increase torsion torque. Accordingly, the friction member 15 always works regardless of the clearance $\epsilon$. Such type of structure is shown in Japanese, Published Utility Model Application No. 61-23543 and Japanese Published Patent Application No. 61-223348 and are well known prior art structures.

When a large torsion torque is applied at a low-speed region such as starting the flywheel etc. for example, the second flywheel 11 is apt to generate a resonance. It is necessary to enlarge the hysteresis torque TH of the friction member 15 in order to avoid this resonance. However, such enlargement of hysteresis torque TH is restricted from the standpoint of damper performance so that it can not be enlarged so much. Further, the friction member 14, functioning as a breakage prevention mechanism at time of generation of resonance, works only to an extent of the maximum engine torque TEMAX which is a limit of the slip commencing torque TL, and a slippage is always produced between the first flywheel 10 and the second flywheel 11 when a large fluctuation torque exceeding the slip commencing torque TL is applied so that energy can not be transmitted efficiently.

DISCLOSURE OF THE INVENTION

An object of the invention is to provide a flywheel assembly which can generate a multi-stage friction force according to a torsion angle range of applied fluctuation torque and also can buffer a large torsion torque while maintaining a damper performance.

STRUCTURE OF THE INVENTION

(1) Technical Measure

This invention provides a flywheel assembly, in which a flywheel to which an engine torque is applied is divided into approximately annular first and second flywheels fronting each other so as to leave a space between the flywheels. The first flywheel is secured to a crank shaft of an engine and the second flywheel is carried rotatably in relation to the first flywheel. An approximately annular and inwardly flange-shaped first hub is secured to an outer peripheral part of the first flywheel. An approximately annular and outwardly flange-shaped second hub is secured to an inner peripheral part of the second flywheel at approximately the same plane with the first hub. Two side plates, connected to the second hub, are installed so as to hold the two hubs therebetween. Torsion springs are installed between the first hub and the side plates. An intermediate friction force generation mechanism, which has a first friction member generating a weak friction force in a small torsion angle range and a second friction member generating a medium friction force in an intermediate torsion angle range, is installed between the flywheels in connection with one side plate. A maximum friction force generation mechanism, which has third friction members generating a maximum friction force in a large torsion angle range, is installed between the both side plates and the second hub. A large torsion torque, exceeding a working torsion angle of the intermediate friction force generation mechanism, can be buffered by a large friction force generated by a slide action of the maximum friction force generation mechanism.

FUNCTION

In the same torsion angle, the flywheel assembly generates only a small friction force exerted by the first friction member so that the damper performance does not become worse.

In the intermediate torsion angle, the second friction member prevents the resonance generated between the both flywheels.

In the large torsion angle, the third friction members slip to prevent a resonance breakage caused by the large friction force.

DESCRIPTION OF THE PREFERRED EMBODIMENT

Figure 1:
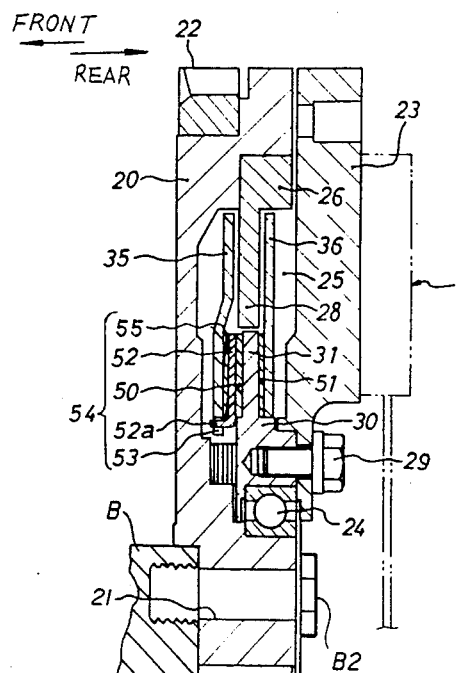
FIG. 1 is a vertical sectional view of a flywheel assembly according to the invention.
Figure 1A:
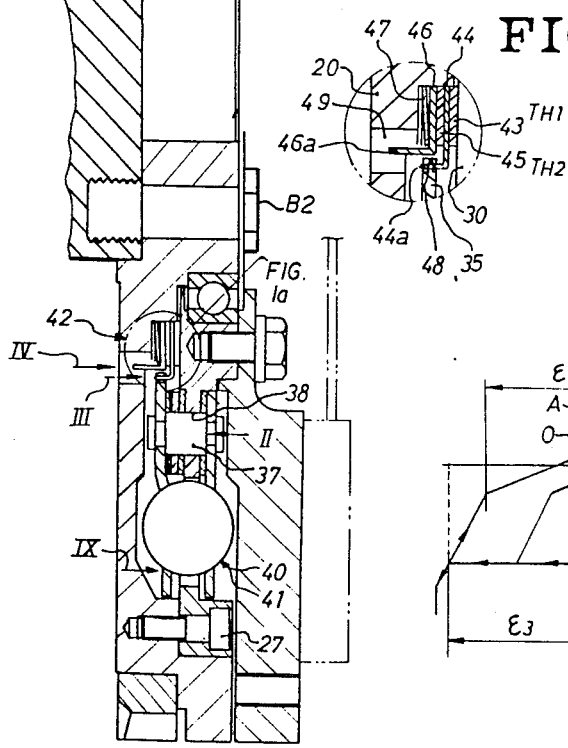
FIG. 1a is an enlarged view of the area circled in FIG. 1.

In FIG. 1, illustrating the flywheel assembly according to the present invention, 20 is an approximately annular first flywheel secured to crank shaft of an engine by bolts B2 piercing holes 21 at an inner peripheral part, for instance, of flywheel 20. A ring gear 22, to which a torque of a starter (not shown) is applied is fitted onto an outer peripheral part of the first flywheel 20.

An approximately annular second flywheel 23 is installed so as to front on the first flywheel 20, and is carried freely rotatably by a bearing 24 in relation to the first flywheel 20. An annular space 25, housing a friction force generation mechanism etc. described later in details, is formed between the first flywheel 20 and the second flywheel 23. Clutch disc Cd is disposed at a rear end face of the second flywheel 23 so that it can be engaged with or disengaged from the second flywheel 23, and is surrounded by a clutch cover (not shown).

A first hub 26 is secured by a bolt 27 to an outer peripheral part of a rear end face of the first flywheel 20, and an inward flange 28 of the first hub 26 extends toward a radial inside to an intermediate part of the space 25. Further, a second hub 30 is secured by a bolt 29 to an inner peripheral part of a front end face of the second flywheel 23. An outward flange 31 of the second hub 30 extends toward a radial outside to the intermediate part of the space 25. The first hub 26 and the second hub 30 are disposed on approximately the same plane, in an axial direction of the flywheels.

Figure 2:
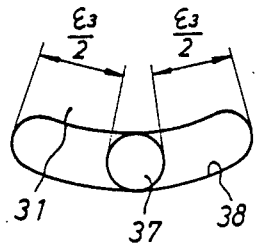
FIG. 2 is a view in the direction of the arrow II, FIG. 1.
Figure 7:
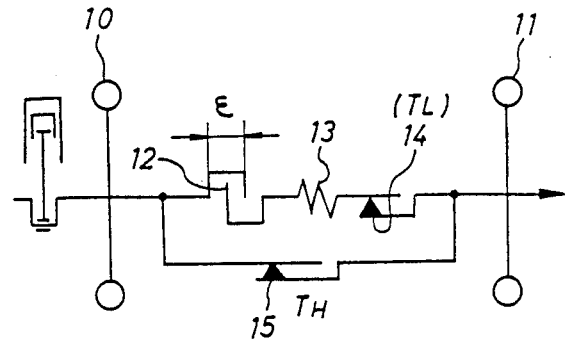
FIG. 7 is a schematic structural diagram of a conventional embodiment.

Two side plates 35 & 36 are so disposed as to hold the foregoing inward flange 28 and the outward flange 31 therebetween, and are connected to each other by pins 37 arranged at circumferential plural places. As illustrated by FIG. 2, pin 37 pierces a slotted hole 38 of the outward flange 31 and is swingable over a clearance $\epsilon 3$, later in details, within a range of the approximately circular-arc-like slotted hole 38.

Torsion springs 40 & 41 are concentrically and compressively installed between the inward flange 28 and the side plates 35 & 36. The torsion spring 40 (spring constant: K1) having a weak spring force exerts its spring force over the entire torsion angle range, and the torsion spring 41 (spring constant: K2, K2>K1) exerts its spring force after the torsion spring 40 has been compressed to an approximately completely compressed state.

Figure 9:
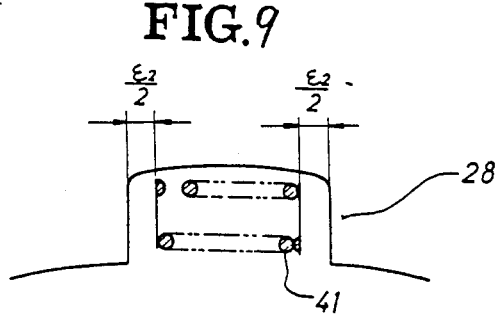
FIG. 9 is a view in the direction of arrow IX, FIG. 1.

A clearance $\epsilon 2$ is provided in the inward flange 28 fronting on the torsion spring 41 as illustrated by FIG. 9, so that a low torsional rigidity corresponding to the weak torsion spring 40 can be produced only within a range of the clearance $\epsilon 2$.

Figure 3:
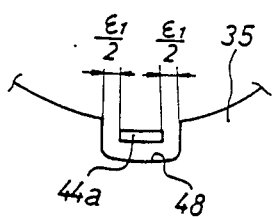
FIG. 3 is a view in the direction of the arrow III, FIG. 1.

An intermediate friction force generation mechanism 42 is interposed between the second hub 30 and the first flywheel 20 and is connected to the side plate 35. A first friction member 43, a first plate 44, a second friction member 45, a second plate 46 and a coned disc spring 47 are installed in the intermediate friction force generation mechanism 42 in this order from the second hub 30 side. The annular first friction member 43 generating a weak hysteresis torque TH1 and is in forced contact with the first plate 44. A claw 44a of the first plate 44 fits in circular-arc-like notch 48 of the side plate 35. The circular-arc-like notch 48 permits the claw 44a to swing over a comparatively small clearance $\epsilon 1$, as illustrated by FIG. 3. The intermediate friction force generation mechanism 42 is described in details in Japanese Patent Application No. 61-294306 and Japanese Patent Application (KOKAI) No. 59-208226.

Figure 4:
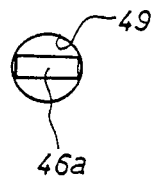
FIG. 4 is a view in the direction of the arrow IV, FIG. 1.
Figure 8:
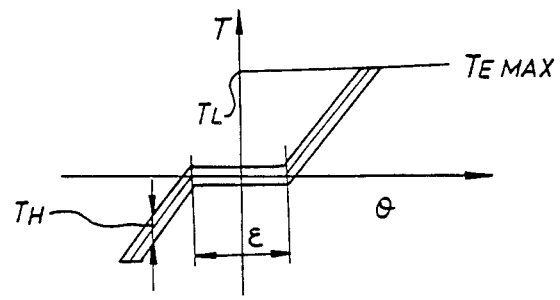
FIG. 8 is a graph for the conventional embodiment.

The annular second friction member 45 generating a medium hysteresis torque TH2 and is in forced contact with the approximately annular second plate 46. A claw 46a of the second plate 46 rigidly fits in a round slotted hole 49 of the first flywheel 20 without any clearance left therebetween as illustrated in FIG. 4.

The coned disc spring 47 is interposed between the second plate 46 and the first flywheel 20. The spring force of the coned disc spring 47 pushes the foregoing plates toward the second hub 30. Clearance $\epsilon 3$ is provided in addition to the clearance $\epsilon 2$ and the clearance $\epsilon 1$. Further, in order to let the clearance $\epsilon 1$, $\epsilon 2$ and $\epsilon 3$ function in regular succession according to increases of torsion angle and loading torque, lengthes of the clearances $\epsilon 1$, $\epsilon 2$ and $\epsilon 3$ are set to satisfy the following relation:

$$\epsilon 1 < \epsilon 2 < \epsilon 3$$

Moreover, two third friction members 50 & 51 and a plate 52 are interposed between the outward flange 31 and the side plate 35. The third friction member 50 is in forced contact with the plate 52. A claw 52a of the plate 52 fits in a notch 53 of the side plate 35 in such a manner as being rigid with the side plate 35. A coned disc spring 55 is interposed between the side plate 52 and the side plate 35. A spring force of the coned disc spring 55 is adapted to produce a large friction force between the third friction member 50 and the second hub 30. On the other hand, as for the right-side third friction member 51, a friction force is produced by a spring force of the corned disc spring 55 applied on the side plate 36.

A hole opens at parts of the third friction members 50 & 51 through which pin 37 passes. The foregoing third friction members 50 & 51 and plate 52 etc. compose a maximum friction force generation mechanism 54.

Figure 5:
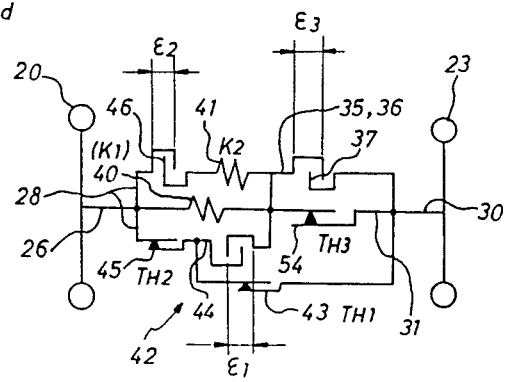
FIG. 5 is a schematic structure diagram illustrating the structure of FIG. 1.

As illustrated in FIG. 5, showing the schematic structural diagram of FIG. 1, the torsion spring 40 and the maximum friction force generation mechanism 54 are connected in series between the first flywheel 20 and the second flywheel 23. The first plate 44 and the second friction member 45 of the intermediate friction force generation mechanism 42 are connected to both ends of the torsion spring 40. The first plate 44 is rotatable within a range of the clearance $\epsilon 1$. The first friction member 43 of the intermediate friction force generation mechanism 42 connects the first plate 44 and the second friction member 45 with the second flywheel 23. The torsion spring 41 is provided in parallel with the torsion spring 40 and the maximum friction force generation mechanism 54, and both ends of the torsion spring 41 are connected to the first flywheel 20 and the second flywheel 23 through the clearances $\epsilon 2$ and $\epsilon 3$, respectively. The side plate 35 existing between the torsion spring 41 and the clearance $\epsilon 3$ is connected to the second hub 30 through the maximum friction force generation mechanism 54.

Figure 6:
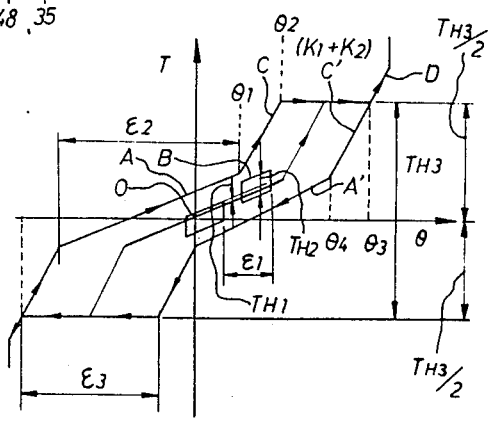
FIG. 6 is a graph showing a change of transmission torque in relation to a torsion angle.

Function will be described hereunder. In the above-mentioned embodiment, as illustrated in FIG. 6 showing the relation between torsion angle $\theta$ and transmission torque T, the maximum friction force generation mechanism 54 is locked by a large friction force so that a torque characteristic A is exercised by the torsion spring 40 (FIG. 1) within a comparatively small angle $\theta 1$. When a comparatively small fluctuation torque is applied in this angle range $0 \sim \theta 1$, a torque characteristic B is exercised by the intermediate friction force generation mechanism 42 (FIG. 1) so that the weakest hysteresis torque TH1 is first exerted by the first friction member 43. When the torsion spring 40 is compressed in a short time by the clearance $\epsilon 1$ with an increase in the torsion angle and the claw 44a of FIG. 3 becomes in forced contact with a circumferential end face of the circular-arc-like notch 48, the hysteresis torque TH2, stronger than the hysteresis torque TH1, is exerted by both the first plate 44 and the second friction member 45.

The hysteresis torque TH1 can be exerted by fluctuation of working angle (torsional action) independently from the clearance $\epsilon 2$ at any position of characteristics A and A' generated within a range of the clearance $\epsilon 3$.

The comparatively weak hysteresis torque works in the range of $0 \sim \theta 1$ fitting into the clearance $\epsilon 1$ as described above, so that the damping effect (damper effect) presented by the first flywheel 20 and the second flywheel 23 is not worsened. Further, when resonance begins to occur, the working angle exceeds the torsion angle corresponding to the length of clearance ε1 and the hysteresis torque TH2 is exerted so that both flywheels 20 & 23 are prevented from coming into the resonance state.

When the loading torque further increases to compress the torsion spring 40 by the clearance ε2, the torsion spring 41 begins to be compressed. Then, the torsion spring 40 and the torsion spring 41 exert their spring forces, within a range of θ1~θ2, to exercise a torque characteristic C the incline of which is steeper than that of the characteristic A.

When the maximum friction force generation mechanism 54 begins slipping at the angle θ2, while exerting the hysteresis torque TH3, the side plates 35 & 36 rotate relatively to the outward flange 31 by the clearance ε3 within the range of the slotted hole 38 of FIG. 2. During this period, the torque T does not increase but only the torsion angle θ increases. When the pin 37 of FIG. 2 becomes forcedly in contact with the circumferential end face of the slotted hole 38, the maximum friction force generation mechanism 54 is locked. The larger the torque T increases, the steeper the incline of torque characteristic D becomes.

When the torque T decreases from the angle θ3, the torque angle θ returns through characteristic C' and A' (θ4).

As described above, the ordinarily generated resonance of the second flywheel 23 can be prevented by the hysteresis torque TH2 of the second friction member 45. As for the torque fluctuation in a range of small torsion angle, less than that corresponding to the clearance ε1, the torque fluctuation is buffered and its vibration is damped by the small hysteresis torque TH1 of the first friction member 43. Further, because such hysteresis torque TH1 is small, the performance of the divided type flywheel can be exercised effectively without worsening the damper performance of the second flywheel 23 carried floatingly by the torsion spring 40.

The hysteresis torque TH3 generated by the maximum friction force generation mechanism 54 is exerted by the slippage of the maximum friction force generation mechanism 54 only within the limited range of working angle of θ2 ~ θ3 corresponding to the clearance ε3 of FIG. 6. Therefore, in a torque region of below a half of the torque TH3 corresponding to the angle θ2, the maximum friction force generation mechanism 54 does not slip so that the maximum friction force generation mechanism 54 buffers a large torque fluctuation (or load) exceeding half of the hysteresis torque TH3 when applied to the flywheel assembly.

The hysteresis torque TH3 of the maximum friction force generation mechanism 54 always produces no slippage over the entire torsion angle between the first flywheel 20 and the second flywheel 23 owing to a stopper mechanism composed of the pin 37 and the slotted hole 38. The maximum friction force generation mechanism 54 is locked within the torsion angle range of 0~θ2 (FIG. 6) corresponding to the clearance ε3, and the maximum friction force generation mechanism 54 slips only within the torque angle range of θ2~θ3 (FIG. 6) corresponding to a clearance range less than the clearance ε3. Consequently, the maximum engine torque TEMAX can be set as a value larger than the half of TH3, so that a large adsorption effect becomes obtainable for a high load shock torque at low speed generated at time of starting the engine, for instance.

Effect of the invention

As described above, in the flywheel assembly according to the present invention; the flywheel to which the engine torque is applied is divided into approximately annular first and second flywheels 20 & 23 fronting each other so as to leave the space 25 therebetween. The first flywheel 20 is secured to the crank shaft of the engine and the second flywheel 23 is carried rotatably in relation to the first flywheel 20. The approximately annular and inwardly flange-shaped first hub 25 is secured to the outer peripheral part of the first flywheel 20 and the approximately annular and outwardly flange-shaped second hub 30 is secured to the inner peripheral part of the second flywheel 23 at approximately the same plane with the first hub 26 two side plates 35 & 36, connected to the second hub 30, are installed so as to hold the two hubs 26 & 30 therebetween. Torsion springs 40 & 41 are installed between the first hub 26 and the side plates 35 & 36. Intermediate friction force generation mechanism 42, which has the first friction member 43, generates the weak friction force in the small torsion angle range. The second friction member 45, generating the medium friction force in the intermediate torsion angle range, is installed between the both flywheels 20 & 23 in connection with one side plate 35. Maximum friction force generation mechanism 54 which has the third friction members 50 and 51, generating the maximum friction force in the large torsion angle range, is installed between the both side plates 35 & 36 and the second hub 30. The large torsion torque exceeding the half of torque TH3 can be buffered by the large friction force generated by the slide action of the maximum friction force generation mechanism 54. Therefore, the following advantages become obtainable.

The ordinarily generated resonance of the second flywheel 23 can be prevented by the hysteresis torque TH2 of the second friction member 45. As for the torque fluctuation in the range of small torsion angle, less than that corresponding to the clearance ε1, the torque fluctuation can be buffered and its vibration can be damped by the small hysteresis torque TH1 of the first friction member 43. Further this hysteresis torque TH1 is small to such an extent that the damper performance of the second flywheel 23 carried floatingly by the torsion spring 40 is not worsened and the performance of the divided type flywheel can be exercised effectively.

In the torque region of below the half of torque TH3 corresponding to the angle θ2, said the stopper mechanism comprised of the pin 37 and the slotted hole 38 does not slip so that is able to buffer a large torque fluctuation exceeding the half of hysteresis torque TH3 when it is applied to the flywheel assembly. Accordingly, this flywheel assembly is suitable for a damper for truck which is repeatedly subjected to high loads at low speed region including large fluctuating engine torque. Further, even when a shock torque at low-speed with high-load generated at time of engine starting is applied, the shock torque can be absorbed effectively by the maximum friction force generation mechanism 54. The maximum friction forces generation mechanism 54 can give full play to its function even at time of engine starting.

The maximum friction force generation mechanism 54 can stop to slip in torsional angle corresponding to over the clearance ϵ3. And then, the mechanism 54 can prevent to slip over prescribed large torsional angle.

I claim:

1. A flywheel assembly for receiving engine torque and having first and second annular flywheels fronting each other with a space therebetween, said first flywheel being secured to a crank shaft of an engine, said second flywheel being mounted on said first flywheel for rotation relative thereto, an approximately annular and radially inwardly extending flange-shaped first hub secured to an outer peripheral part of said first flywheel, an approximately annular and radially outwardly extending flange-shaped second hub secured to an inner peripheral part of said second flywheel in approximately a same plane with said first hub, two side plates connected to said second hub and holding said first hub and said second hub therebetween, torsion springs between said first hub and said side plates, an intermediate friction force generation mechanism having a first friction member for generating a relatively weak friction force in a small torsion angle range and a second friction member for generating a relatively medium friction force in an intermediate torsion angle range mounted between said first and second flywheels and a first of said two side plates, a maximum friction force generation mechanism having third friction members for generating a relatively large friction force in a large torsion angle range mounted between a second of said two side plates and said second hub, whereby a large torsion torque generated by said third friction member and exceeding a working torsion angle of said relative medium friction force generated by said second friction member can be buffered by said relatively large friction force generated by a slide action of said maximum friction force generation mechanism.

2. A flywheel assembly as set forth in claim 1, in which said intermediate friction force generation mechanism includes, in order of arrangement, a first friction member, a first plate, a second friction member, a second plate and a coned disc spring all being formed into an approximately annular shape in said order of arrangement from said second hub side; a claw fitted in a circular-arc-like notch formed on said first plate; a small arcuate clearance formed between said claw and said circular-arc-like notch; and a claw on said second plate and fitted in a hole in said first flywheel without circumferential clearance therebetween.

3. A flywheel assembly as set forth in claim 1, in which said maximum friction force generation mechanism has substantially annular third friction members forcedly contacting opposite faces of said second hub, a substantially annular plate forcedly contacting one of said third friction members mounted between said second of said two side plates and said one of said third friction members, an approximately annular coned disc spring mounted between said substantially annular plate and said second of said two side plates, and a claw fitting in a notch in said substantially annular plate without circumferential clearance therebetween.

4. A flywheel assembly as set forth in claim 1, in which said side plates are connected by a pin passing through an arc-like slotted hole in an outward flange on said second hub, permitting said pin to swing freely in said slotted hole.

5. A flywheel assembly as set forth in claim 1, in which said torsion springs fit in a notch in an inward flange of said first hub with a medium clearance between one of said torsion springs and a circumferential end face of said notch.

6. A flywheel assembly as set forth in claim 1, in which said first hub has an outer peripheral part and an inward flange and secured by bolts at said outer peripheral part to an outer peripheral part of an end face of said first flywheel fronting on said space between said first and second flywheels, and extends toward a radial inside of said space to be consecutive over the entire circumference of said space.

7. A flywheel assembly as set forth in claim 1, in which said second hub has an inner peripheral part and an outward flange and is secured by bolts at said inner peripheral part to an inner peripheral part of an end face of said second flywheel fronting on said second hub, an inner peripheral surface of said second hub being fitted onto a bearing supporting said second flywheel; and extends towards a radial outside of said space between said first and second flywheels and being consecutive over the entire circumference of said space.

* * * * *